(12) United States Patent  
Victor et al.

(10) Patent No.: US 8,717,719 B2  
(45) Date of Patent: May 6, 2014

(54) INVERTER, POWER GENERATION SYSTEM AND METHOD OF OPERATING A POWER GENERATION SYSTEM

(75) Inventors: Matthias Victor, Niestetal (DE); Frank Greizer, Kaufungen (DE)

(73) Assignee: SMA Solar Technology AG, Niestetal (DE)

( * ) Notice: Subject to any disclaimer, the term of this patent is extended or adjusted under 35 U.S.C. 154(b) by 345 days.

(21) Appl. No.: 13/105,124

(22) Filed: May 11, 2011

(65) Prior Publication Data

US 2012/0163048 A1   Jun. 28, 2012

(30) Foreign Application Priority Data

Dec. 22, 2010 (DE) .......................... 10 2010 055 550

(51) Int. Cl.
*H02H 3/00* (2006.01)
*H02H 9/00* (2006.01)

(52) U.S. Cl.
USPC .............. 361/42; 361/47; 363/131; 363/55; 307/80; 136/244

(58) Field of Classification Search
USPC .................. 361/42, 47; 363/131, 55; 307/80; 136/244, 243
See application file for complete search history.

(56) References Cited

U.S. PATENT DOCUMENTS

| | | | | |
|---|---|---|---|---|
| 4,870,527 A | * | 9/1989 | Zaleski | 361/44 |
| 8,502,416 B2 | * | 8/2013 | Falk | 307/77 |
| 2002/0118559 A1 | * | 8/2002 | Kurokami et al. | 363/131 |
| 2007/0285102 A1 | * | 12/2007 | Muller | 324/525 |
| 2008/0084643 A1 | * | 4/2008 | Flottemesch et al. | 361/93.2 |
| 2008/0123266 A1 | * | 5/2008 | Hung | 361/681 |
| 2009/0121549 A1 | * | 5/2009 | Leonard | 307/51 |
| 2010/0001587 A1 | * | 1/2010 | Casey et al. | 307/80 |
| 2010/0308662 A1 | * | 12/2010 | Schatz et al. | 307/80 |
| 2011/0031813 A1 | * | 2/2011 | Falk | 307/77 |
| 2011/0234126 A1 | * | 9/2011 | Meyer, III | 318/400.3 |
| 2012/0126626 A1 | * | 5/2012 | Falk et al. | 307/80 |
| 2012/0161527 A1 | * | 6/2012 | Casey et al. | 307/80 |
| 2012/0223734 A1 | * | 9/2012 | Takada et al. | 324/761.01 |
| 2013/0027077 A1 | * | 1/2013 | Oughton et al. | 324/764.01 |

FOREIGN PATENT DOCUMENTS

JP        06094762   *   4/1999  ............. G01R 27/02

* cited by examiner

*Primary Examiner* — Jared Fureman
*Assistant Examiner* — Angela Brooks
(74) *Attorney, Agent, or Firm* — Eschweiler & Associates, LLC

(57) ABSTRACT

The invention relates an inverter that may be set up as part of a power generation system for the connection of a number of substrings, which, using DC switches, can be connected to each other in series into a string and with the inverter. The inverter includes a bridge circuit to transform the power generated by the string comprising series-connected substrings into a grid-compatible AC voltage and to feed the power into a grid. The inverter also includes a ground fault detector arranged on the AC side of the bridge circuit for ground fault monitoring of the string. A controller connected to the ground fault detector controls the DC switches so that in case of a ground fault, a complete decoupling of the connection of the string from the bridge circuit and a separation of the string into potential-free substrings is performed. A method of operating such a power generation system is also described.

19 Claims, 5 Drawing Sheets

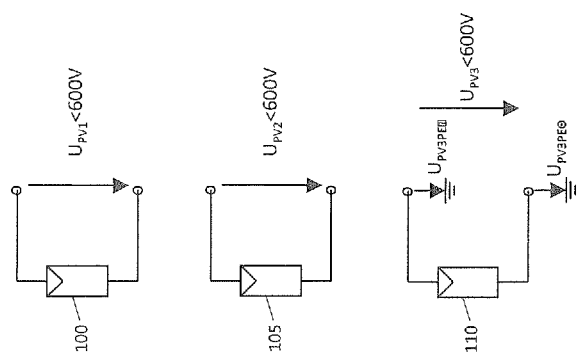

INVERTER, POWER GENERATION SYSTEM AND METHOD OF OPERATING A POWER GENERATION SYSTEM

REFERENCE TO RELATED APPLICATIONS

This application claims priority to Germany Patent Application No. DE10 2010 055550.9, filed on Dec. 22, 2010, entitled, "Inverter, Power Generation System and Method of Operating a Power Generation System" which is hereby incorporated by reference in its entirety.

FIELD

The invention relates to an inverter, in particular as part of a power generation system, and a method of operating a power generation system.

BACKGROUND

In times of increasing resource scarcity and climate change resulting from an increase in the concentration of atmospheric carbon dioxide, renewable energy—especially energy production with PV systems—is growing in importance. To achieve economical energy generation with minimal use of cables, a number of PV modules, each with a number of PV cells, are connected serially in a so-called string, thereby generating a high DC voltage. This DC voltage is transformed in an inverter into a grid-compatible AC voltage so that the DC power generated by the string can be fed into the grid as AC power and used at other locations.

By connecting PV modules in series as a string, DC voltages are achieved that can exceed maximum values allowed for safety reasons. For example, in the USA, in such systems only DC voltages lower than 600V with respect to ground potential are allowed. This limits the maximum DC voltage of a string to 1200 V, as long as it is ensured that the string potential is distributed symmetrically relative to the ground potential. This can be achieved by grounding at the string midpoint, for example. However, such a grounding limits the flexibility of the configuration of the power generation system, in particular when used with transformerless inverters.

Inverter topologies exist that can guarantee a distribution of the potential of the connected string to ground potential during operation within the allowed range even without midpoint grounding, avoiding the limitations described above. However, measures must be taken here to ensure that potentials at all points on the string remain within the range allowed when the inverter is not in operation.

Document U.S. Pat. No. 6,593,520 presents a process for decoupling a faulty string from an inverter. First, the connection of the string to the inverter is decoupled, then the faulty string is divided into a number of substrings, wherein the voltage of each substring is chosen in such a way that as a result of the division, the string is put in a safe state.

Document U.S. Pat. No. 7,768,751 describes a power generation system that detects a ground fault in the conductors of the DC side of a string using a ground fault detector. When a ground fault is detected, the string is decoupled from the inverter and divided into substrings, wherein the substrings are grounded using auxiliary switches.

Another method for detecting a ground fault is presented in document DE102006022686.

SUMMARY

Therefore, the invention described herein according to one embodiment provides an improved inverter that ensures compliance to a maximum value of the generator potential relative to ground both during operation and when operation is interrupted. Another embodiment provides a process for transferring the generator to a safe state, in particular in case of a ground fault.

Further advantageous embodiments of the invention can be found in the patent claims, the description and drawings. The advantages of the features and combinations of features mentioned in the description merely serve as examples and may be applied either alternatively or cumulatively without the advantages being necessarily achieved by embodiments according to the invention. Additional features can be taken from the drawings. The combination of features in different embodiments of the invention or the combination of features from different claims may also deviate from the explicit references between the claims and is hereby encouraged. This also applies to any features depicted in separate drawings or mentioned in their description. These features can also be combined with the features of different patent claims.

Evidently, it is also possible to use the inverter in multi-phase mode, in particular three-phase mode, although for sake of clarity, the following explanation only deals with the invention using a single-phase inverter. An implementation of the invention in multi-phase systems is familiar to a person skilled in the art upon reading this disclosure.

BRIEF DESCRIPTION OF THE DRAWINGS

The invention shall be further explained and described in the following with reference to the enclosed drawings and based on various embodiments, wherein.

DETAILED DESCRIPTION

Figure 1:
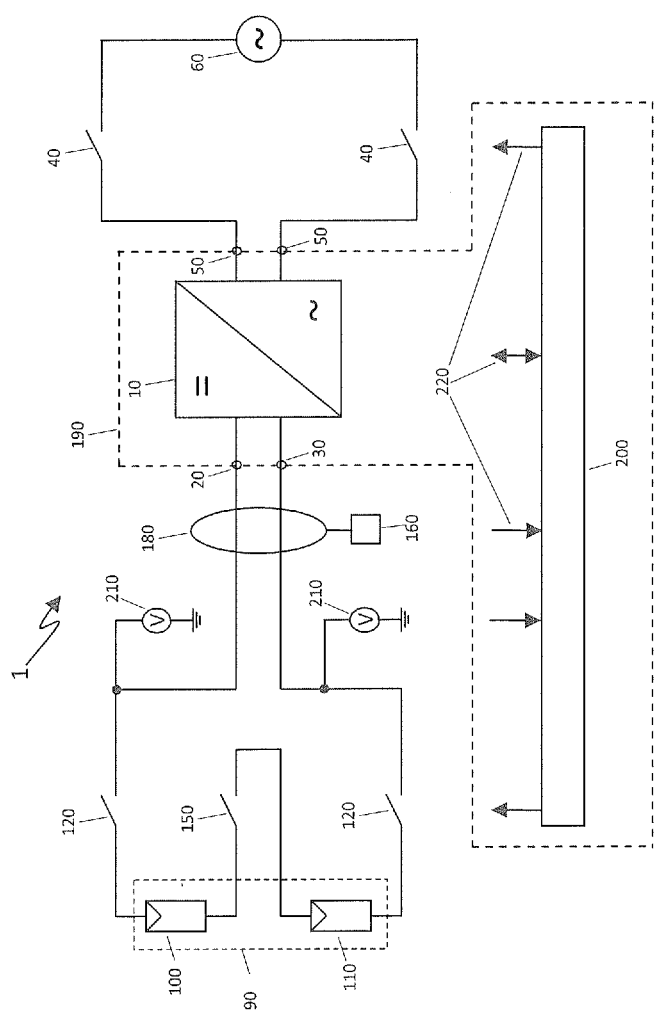
FIG. 1 shows a first configuration for power generation.

FIG. 1 shows the structure of a power generation system 1. For the generation of electrical power from sunlight substrings (that include photovoltaic modules) 100 and 110 are arranged so that they are connected in series into a string 90 using a DC switch 150 and, using two additional DC switches 120, are connected to the terminals 20 and 30 of a DC input of a bridge circuit 10. Hereby, the potentials of the terminals 20 and 30 relative to ground potential are each monitored with a voltmeter 210. A differential current transformer 180 coupled to the cables to the substrings 100, 110 and connected to a ground fault detector 160 is configured to determine if a ground fault is present on the DC input side, in particular in the area of the substrings 100, 110. Such ground fault monitoring is well-known and requires no further explanation here.

On the AC side, the bridge circuit 10 is connected to a grid 60 using terminals of an AC output 50. AC switches 40 are provided to disconnect the bridge circuit 10 from the grid 60.

A controller 200 is provided for the operation of the inverter, which receives signals from inverter components and sends control signals. In FIG. 1, these signals are depicted as arrows of a signal direction 220, wherein the signals lead from and to the respective components arranged vertically above the arrows. At least the controller 200 and the bridge circuit 10 of the presented components of the power generation system are arranged in the enclosure 190 of the inverter, wherein additional components, in particular components with which the controller 200 exchanges signals, may also be located within the enclosure 190.

Figure 2:
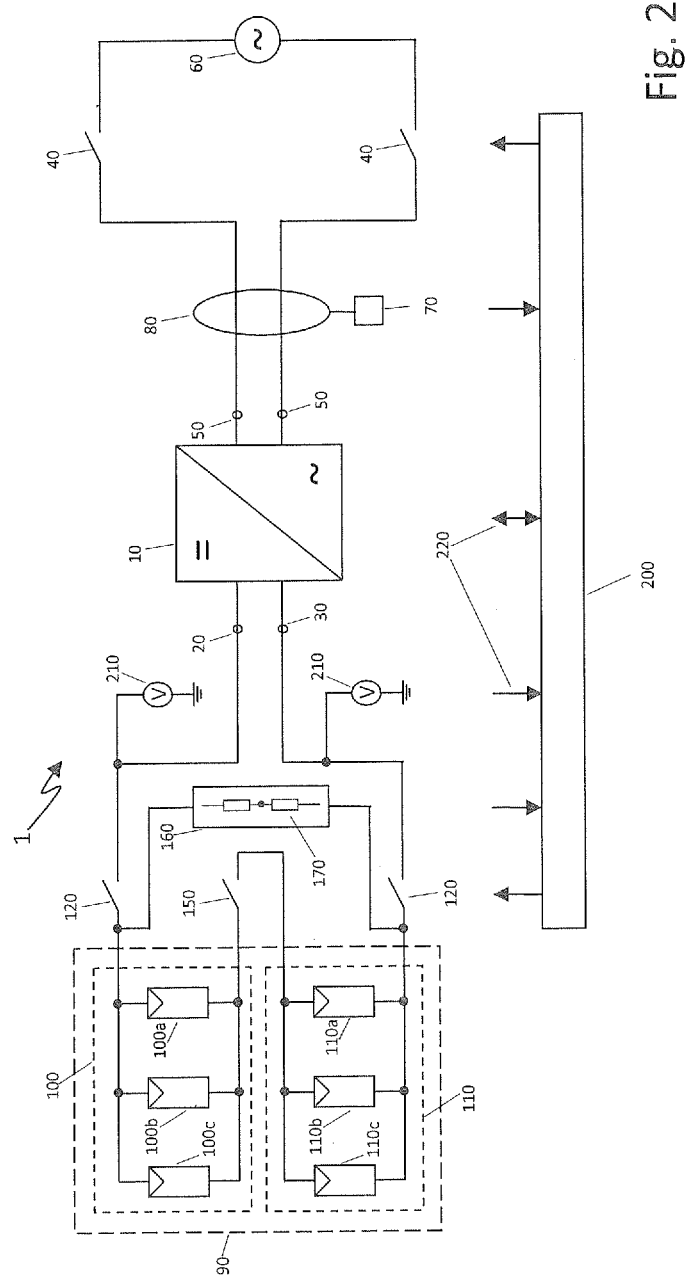
FIG. 2 shows a second configuration for power generation with several substrings connected in parallel.

FIG. 2 shows an additional embodiment of a power generation system 1 in which the substrings 100 and 110 are each formed using three parallel sub-substrings 100*a*, 100*b*, 100*c* and 110*a*, 110*b*, 110*c*. In this way, the performance of the system can be increased without increasing the potentials of the substrings. Additionally, between the sides of the DC switches 120 facing away from the bridge circuit 10, an insulation resistance tester 160 including a measuring bridge 170 is arranged, which serve to measure insulation resistance, in particular for ground fault monitoring. Even with open DC switches 120, such a measuring bridge permits the testing of a string 90 formed by series-switched substrings 100, 110 after closure of the DC switch (or the DC switches 150 in case of more than two substrings 100, 110, wherein it is conceivable to close only some of the DC switches 150) with regard to a possible ground fault. In this way, a ground fault, which would necessitate an immediate decoupling of the inverter, can be ruled out before connecting the inverter to the grid 60. After the completion of the insulation resistance test, the series connection can be removed.

In a variation not shown, each substring 100, 110 can be assigned its own insulation resistance tester 160, which is connected in parallel with the corresponding substring. In this case, a complete isolation monitoring of all substrings 100, 110 can be performed without actuating the DC switches 150.

The power generation system 1 has a ground fault detector 70, which is set up using a differential current transformer 80 to detect a ground fault on the substrings 100, 110. The ground fault detector 70 is arranged on the AC side of the bridge circuit 10. Such a monitoring configuration allows regular reliable ground fault monitoring of the substrings 100, 110 without or with only minimal additional effort, since a monitoring of the current on the AC side may as well be necessary for another reason. The ground fault detector 70 and the insulation resistance tester 160 are also coupled to the controller 200, so that the detection of a ground fault influences the operation of the inverter in such a way that, in one embodiment, the inverter can be decoupled from the grid or the substrings can be put in a safe state through decoupling and separation.

In this way, in one embodiment of the invention, an operation of the inverter is possible such that during operation of the inverter, the power of the string with series-connected substrings 100, 110 is transformed into a grid-compatible AC voltage and fed into the grid 60, and the substrings 100, 110 are monitored for a ground fault continuously or at intervals via the ground fault detector 70 on the AC side of the bridge circuit 10. When such a ground fault is detected, the string is divided into the individual substrings 100, 110 by opening the DC switch 150 and is decoupled from the bridge circuit by opening the DC switches 120. After decoupling, the individual substrings exhibit no systematic potential to ground (i.e., potential-free), wherein their potential in relation to ground potential is allowed to fluctuate or float (in the following also referred to as potential-free state), as long as the affected substring does not exhibit a ground fault.

To ensure the safe state after division into substrings, the size of the substrings is chosen in such a way that in both cases (when the considered substring being has a potential coupled to ground potential, as well as when the substring is in a potential-free state), the potential at all points on the substring does not exceed a predetermined maximum value in relation to ground. Such a situation is illustrated in FIG. 4*a*, and the reader is referred to the explanations associated with the description of this figure. For example, if the allowed potential value is 600 V, maintaining this value is ensured when all substrings 100, 110 have an open-circuit voltage of less than 600 V. Compared to a fixed grounding of the substring at one point, this has the advantage that the potential distribution of a string or substring in a potential-free state usually develops approximately symmetrical to the ground potential, i.e. in this case, the substring would only have an approximate potential of +/−300V relative to ground potential. Furthermore, when contacting a potential-free substring at any point, its potential relation to ground would change in such a way that a discharge current would flow at the point of contact only during the creation of a new potential relation. Hereby, the point of contact would be drawn to a defined potential, for example to ground potential, without necessarily resulting in a danger.

Before starting up the inverter, that is, before connecting the inverter to the grid 60, the substrings 100, 110 can first be checked for the presence of a ground fault using the insulation resistance tester 160, obviating the immediate decoupling of the inverter after start-up. Only in case that no ground fault is detected by the insulation resistance tester 160, the feed-in of electrical power into the grid 60 begins.

In an advantageous switching sequence, the start-up of the inverter is initialized by first closing at least one of the AC switches 40. This way, the inverter can be supplied with a suitable reference potential of the grid 60. Subsequently, the DC switches 120 are closed. In this state, the reference potential available through the closed AC switch or switches 40 can be used for the substrings 100, 110 connected through the DC switches 120 with the inverter to ensure that these substrings remain within an allowed potential range relative to ground potential. Thereafter, the series connection of the substrings 100, 110 to a string 90 is effected by closing the DC switch/switches 150. If the string 90 comprises a large number of substrings, a switching sequence for the DC switches 150 is advantageous in which the DC switches 150 closest to the inverter are closed first, and then from there the DC switches 150 are closed sequentially in the direction towards the middle of the string 90. In this way, it can be prevented that substrings are created even for a short period of time that are potential-free, but still are connected to other substrings, and in this way possibly exhibit areas with a potential outside of the allowed range.

If not all of the AC switches 40 to be closed for the feed-in are closed yet, this is done now, and the feed-in into the grid 60 can begin.

Accordingly, a shut-down of the inverter, whether due to a ground fault or for other reasons, can be performed in an advantageous switching sequence in substantially reverse sequence. After the feed-in into the grid 60 is ended, when necessary, all but one of the AC switches 40 can be opened so that no more feed-in into the grid 60 occurs. Thereafter, the series connection of the substrings 100, 110 is disconnected by opening the DC switch or switches 150. The switching sequence mentioned above for a large number of substrings for the DC switches 150 can be used here in reverse sequence, i.e. from the middle of the string 90 to the DC input terminals 20, 30. This decouples and divides all but the two outermost substrings from the inverter. Subsequently, the DC switches 120 are opened so that all substrings are decoupled from the inverter and separated from each other. Then the remaining AC switches 40 are opened so that the inverter is completely decoupled from grid 60.

Figure 3:
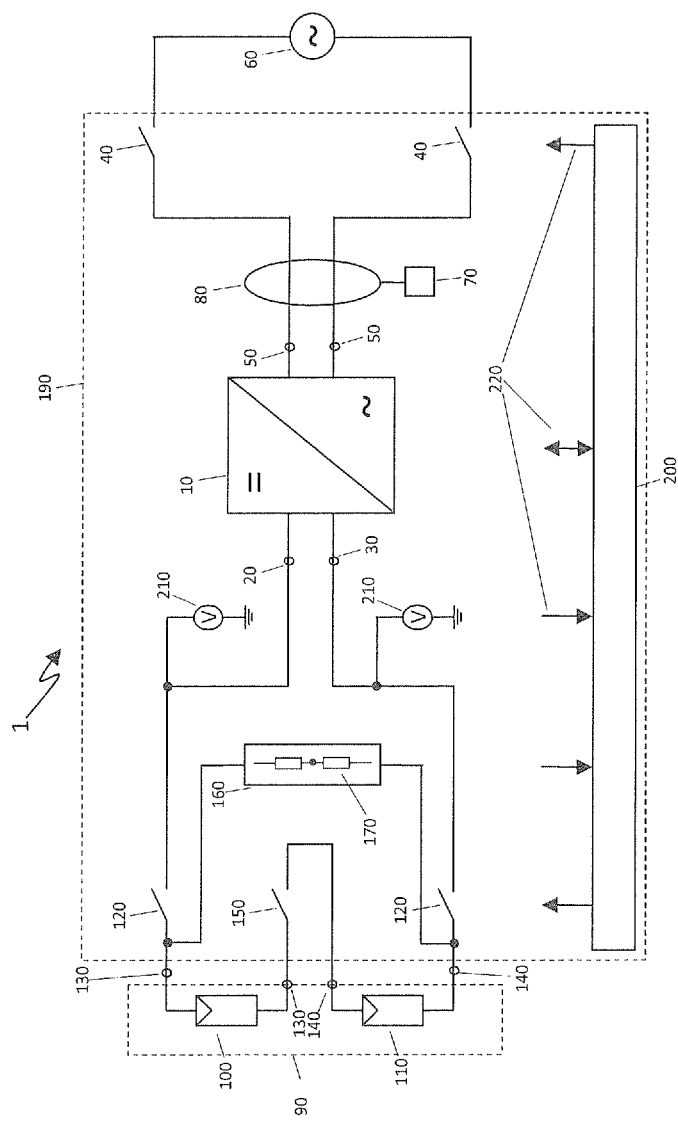
FIG. 3 shows a third configuration for power generation.

As shown in FIG. 3, it is advantageous to integrate one or more components in an enclosure 190 of the inverter, in particular the DC switches 120, 150, the AC switches 40, the bridge circuit 10, the controller 200, the voltmeters 210, the insulation resistance tester 160 and the ground fault detector 70. In this way, a reliable interaction of these components to achieve safe operation and reliable decommissioning of the system in the event of danger—such as a ground fault—can be ensured. The substrings are connected to the terminals 130 and 140 on the enclosure 190 of the inverter.

In an advantageous embodiment not shown, the inverter is arranged for the connection of two or more independent strings, each of which comprises several substrings. Here, each string can be assigned its own MPP tracker, which in operation regulates the voltage of the string to the value at which the string delivers maximum power. In this case, when necessary, each string and its substrings can be monitored with a ground fault detector or insulation resistance tester for a ground fault and the decoupling and separation of a string into potential-free substrings can occur, while the other strings remain connected to the inverter and continue to feed power into the grid. Here, the inverter would remain connected to the grid in case of ground fault, wherein it is also contemplated that all strings in this case could be decoupled and the inverter decoupled from the grid.

Even though the ground fault detector 70 on the AC side of the bridge circuit 10 can only monitor ground faults for the entirety of the connected strings, it is possible to identify the string that triggered the ground fault and decouple and separate it accordingly. For this, for example, the connected strings can be decoupled from the inverter successively to monitor the effect on the ground fault signal of the ground fault detector 70 associated with the ground fault. The goal of this measure is to continue the feed-in with the strings that do not have a ground fault and only to decouple and divide the string or strings affected by the ground fault.

Figure 4B:
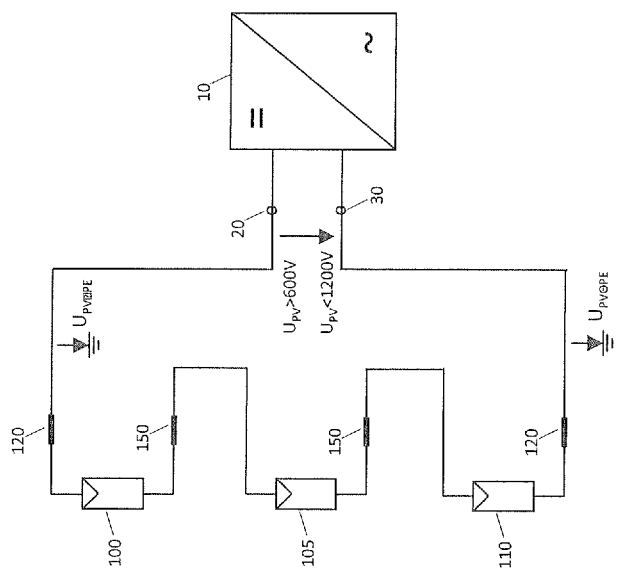
FIG. 4 illustrates the potential relations of the unconnected substrings and the configuration of the substrings in an operating state.

The relative potentials of three substrings 100, 105, 110 are illustrated in FIGS. 4a and 4b for the case that the substrings are decoupled from the inverter and separated in a non-operating state of the inverter (FIG. 4a), and during the operating state of the inverter (FIG. 4b). In the case of the separated potential-free substrings, each substring has a voltage UPV1, UPV2, UPV3 of less than 600 V, an assumed allowed maximum value, wherein this voltage develops independently to ground. Consequently, for example, the substring 110 would have a voltage of UPV3PE+ on the positive end and UPV3PE− on the negative end of the substring 110, both of which are less than 600 V, and typically have approximately half the amount of UPV3 due to a symmetrical potential distribution that occurs.

In operation, i.e. with closed DC switches 120, 150, a voltage UPV of more than 600V but with a maximum of 1200V can be present in the case of symmetrical potential distribution of the string 90 relative to ground potential on DC input terminals 20, 30 without violating the voltage requirement of a maximum of 600V, for example, in relation to ground at every point of the power generation system 1, since in operation the inverter itself ensures a potential relation of the connected substrings. This can occur in such a way that the inverter regulates a voltage UPV−PE on the negative DC input terminal 30 to a given value or within a given range, or it regulates or independently sets a voltage UPV+PE on the positive DC input terminal 20 to a given value or within a given range. A potential relation to ground potential created by the inverter in operation can be both, the result of an active control or the result of a specific topology used in the bridge circuit 10.

The invention claimed is:

1. An inverter configured to connect a number of substrings selectively connected to each other in series into a string and to the inverter by DC switches, comprising:
   a bridge circuit configured to transform the power generated by the string comprising the serially connected substrings into a grid-compatible AC voltage and feed the power into a grid;
   a ground fault detector configured to provide ground fault monitoring of the string and arranged on an AC side of the bridge circuit; and
   a controller connected to the ground fault detector, configured to control the DC switches so that in case of a ground fault detected by the ground fault detector the string is decoupled from the bridge circuit and separated into potential-free substrings.

2. The inverter according to claim 1, wherein the DC switches are integrated in an enclosure of the inverter.

3. The inverter according to claim 1, wherein the inverter further comprises an insulation resistance tester configured to measure insulation resistance on a DC side of the bridge circuit.

4. The inverter according to claim 1, wherein the inverter comprises DC inputs for the connection of at least two strings thereto, and wherein for each of the at least two strings, a maximum power point tracker is provided.

5. The inverter according to claim 1, wherein the inverter comprises a voltmeter for each terminal of the string to determine a string potential to ground for each terminal, respectively.

6. A power generation system comprising an inverter according to claim 1, wherein the power generation system comprises a number of substrings connected to each other in series to form the string and are connected to the inverter using the DC switches.

7. The power generation system according to claim 6, wherein the substrings comprise a parallel connection of sub-substrings.

8. A method of operating a power generation system comprising a plurality of substrings selectively connected to each other in series into a string by DC switches, the string being connected to an inverter by additional DC switches, wherein the method comprises:
   transforming power generated by the string comprising serially connected substrings into a grid-compatible AC voltage using the inverter and feeding the power into a grid;
   monitoring the string for a ground fault by measuring a ground fault current on an AC side of the inverter; and
   in case of a ground fault, decoupling the string from the inverter and separating the string into potential-free substrings.

9. The method according to claim 8, further comprising performing an insulation resistance test on a DC side of the inverter before transforming the power.

10. The method according to claim 8, wherein the inverter is further decoupled from the grid in case of a ground fault.

11. The method according to claim 8, wherein the power generation system comprises a plurality of strings, wherein in case of a ground fault only the affected string is decoupled and separated, while the feed-in continues with the remaining strings.

12. The method according to claim 8, wherein the inverter is coupled to the grid through one or more AC switches, further comprising prior to transforming the power:
   closing at least one AC switch of the one or more AC switches;

subsequently closing the additional DC switches; and
subsequently closing the DC switches to connect the substrings in series to form the string.

13. The method according to claim 8, wherein the inverter is coupled to the grid through one or more AC switches, wherein decoupling and separating the string comprises:
opening the DC switches;
subsequently opening the additional DC switches; and
subsequently decoupling the inverter from the grid by opening at least one AC switch of the one or more AC switches.

14. An inverter, comprising:
a bridge circuit configured to receive DC power at input terminals on a DC side thereof and convert the DC power to AC power at output terminals on an AC side thereof;
first DC switches in series with the input terminals, respectively, of the bridge circuit, the first DC switches configured to couple the input terminals to opposing ends of a string of series-connected substrings;
at least one second DC switch configured to selectively couple the series-connected substrings to one another;
a ground fault detector on the AC side of the bridge circuit, and configured to identify a ground fault associated with the inverter; and
a controller configured to control the first DC switches and the at least one second DC switch based on a status signal provided by the ground fault detector.

15. The inverter of claim 14, further comprising AC switches in series with the output terminals, respectively, of the bridge circuit, the AC switches configured to decouple the inverter from a grid.

16. The inverter of claim 14, wherein the ground fault detector is configured to identify the ground fault on an AC side of the bridge circuit.

17. The inverter of claim 16, further comprising an insulation resistance tester configured to measure an insulation resistance on a DC side of the bridge circuit and provide a status thereof to the controller.

18. The inverter of claim 14, further comprising voltmeters coupled to the input terminals of the bridge circuit, respectively, wherein the voltmeters are configured to provide a voltage at the input terminals of the bridge circuit to the controller.

19. The inverter of claim 15, wherein upon detection of a ground fault or other fault condition, the controller is configured to first open the at least one second DC switch, then open the first DC switches, and then open the AC switches.

* * * * *